(12) United States Patent
Seluga

(10) Patent No.: US 11,403,444 B1
(45) Date of Patent: Aug. 2, 2022

(54) GOLF CLUB FACE THICKNESS OPTIMIZATION METHOD

(71) Applicant: Callaway Golf Company, Carlsbad, CA (US)

(72) Inventor: James A. Seluga, Carlsbad, CA (US)

(73) Assignee: Callaway Golf Company, Carlsbad, CA (US)

(*) Notice: Subject to any disclaimer, the term of this patent is extended or adjusted under 35 U.S.C. 154(b) by 583 days.

(21) Appl. No.: 16/424,758

(22) Filed: May 29, 2019

Related U.S. Application Data

(60) Provisional application No. 62/677,805, filed on May 30, 2018.

(51) Int. Cl.
| | |
|---|---|
| G06F 30/23 | (2020.01) |
| A63B 53/04 | (2015.01) |
| A63B 37/00 | (2006.01) |
| G06F 111/10 | (2020.01) |

(52) U.S. Cl.
CPC .......... G06F 30/23 (2020.01); A63B 37/007 (2013.01); A63B 53/04 (2013.01); A63B 53/0416 (2020.08); G06F 2111/10 (2020.01)

(58) Field of Classification Search
CPC .... G06F 30/23; G06F 2111/10; A63B 37/007; A63B 53/04; A63B 53/0416
See application file for complete search history.

(56) References Cited

U.S. PATENT DOCUMENTS

| | | | | |
|---|---|---|---|---|
| 5,877,970 | A * | 3/1999 | Nesbit | A63B 60/00 |
| | | | | 700/95 |
| 7,082,426 | B2 * | 7/2006 | Musgrove | G06Q 20/12 |
| | | | | 715/204 |
| 9,889,349 | B1 * | 2/2018 | Seluga | A63B 60/00 |
| 10,532,254 | B1 * | 1/2020 | Evans | A63B 53/0466 |
| 2007/0015601 | A1 * | 1/2007 | Tsunoda | A63B 60/00 |
| | | | | 473/346 |
| 2008/0270084 | A1 * | 10/2008 | Ageishi | G06F 30/23 |
| | | | | 703/1 |
| 2010/0160072 | A1 * | 6/2010 | Matsunaga | G06F 30/23 |
| | | | | 473/324 |
| 2010/0161294 | A1 * | 6/2010 | Matsunaga | A63B 53/0466 |
| | | | | 473/345 |
| 2012/0115626 | A1 * | 5/2012 | Davenport | A63B 69/3632 |
| | | | | 473/223 |
| 2017/0014690 | A1 * | 1/2017 | Morin | A63B 60/52 |
| 2018/0264347 | A1 * | 9/2018 | Tran | H04N 5/2253 |
| 2018/0290034 | A1 * | 10/2018 | Shimono | A63B 60/46 |
| 2018/0311560 | A1 * | 11/2018 | Motokawa | A63B 60/00 |
| 2019/0076709 | A1 * | 3/2019 | Shimono | G06F 30/00 |
| 2022/0118326 | A1 * | 4/2022 | Halberg | A63B 53/047 |

* cited by examiner

Primary Examiner — Kibrom K Gebresilassie
(74) Attorney, Agent, or Firm — Michael A. Catania; Rebecca Hanovice; Sonia Lari

(57) ABSTRACT

A method of optimizing golf club head and golf ball design is disclosed herein. The method includes inputting a RBF for stress, a RBF for CT and a RBF for ball speed into an Adaptive Simulated Annealing algorithm to generate an optimized structure for the club head for ball speed.

4 Claims, 2 Drawing Sheets

GOLF CLUB FACE THICKNESS OPTIMIZATION METHOD

CROSS REFERENCES TO RELATED APPLICATIONS

The Present Application claims priority to U.S. Provisional Patent Application No. 62/677,805, filed on May 30,2018, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to a golf club head and golf ball design optimization method. More specifically, the present invention is directed to a face thickness optimization method that yields novel, high-performance, variable face thickness patterns for golf club heads.

Description of the Related Art

The prior art discloses numerous golf club heads with variable face thickness patterns. Some examples include U.S. Pat. Nos. 6,354,962, 6,368,234, 6,435,977, 6,398,666, 6,623,377, 6,491,592, 6,582,323, 7,137,907, 7,101,289, 7,258,626, 8,012,041, and 8,696,489. However, the prior art fails to disclose a method of optimizing, for a given golf club head, the variable face thickness pattern, and efficiently manufacturing a face having that pattern.

BRIEF SUMMARY OF THE INVENTION

The method of the present invention is a computer-aid optimization analysis yielding variable face thickness patterns for golf club heads that achieve large increases in coefficient of restitution (COR) while conforming to USGA and R&A regulations.

One aspect of the present invention is a non-transitory computer readable medium storing instructions that optimize the structure of a golf club head for ball speed, when executed by a processor of an apparatus.

Another aspect of the present invention is a method for optimizing the structure of a golf club head for ball speed.

Yet another aspect of the present invention is a method for optimizing the structure of a golf club head for ball speed. The method includes generating a radial basis function ("RBF") for stress of a golf club head from a finite element analysis ("FEA") program using a plurality of face thickness points for the golf club head and a plurality of body thickness points for the golf club head. The method also includes generating a RBF for characteristic time ("CT") of a golf club head from a FEA program using a plurality of face thickness points for the golf club head and a plurality of body thickness points for the golf club head. The method also includes generating a RBF for ball speed of a golf club head from a FEA program using a plurality of face thickness points for the golf club head and a plurality of body thickness points for the golf club head. The method also includes inputting the RBF for stress, the RBF for CT and the RBF for ball speed into an Adaptive Simulated Annealing algorithm to generate an optimized structure for the club head for ball speed.

Yet another aspect of the present invention is a non-transitory computer readable medium storing instructions that optimize the structure of a golf club head for ball speed, when executed by a processor of an apparatus, cause the apparatus to: generate a radial basis function ("RBF") for stress of a golf club head from a finite element analysis ("FEA") program using a plurality of face thickness points for the golf club head and a plurality of body thickness points for the golf club head; generate a RBF for characteristic time ("CT") of a golf club head from a FEA program using a plurality of face thickness points for the golf club head and a plurality of body thickness points for the golf club head; generate a RBF for ball speed of a golf club head from a FEA program using a plurality of face thickness points for the golf club head and a plurality of body thickness points for the golf club head; and input the RBF for stress, the RBF for CT and the RBF for ball speed into an Adaptive Simulated Annealing algorithm to generate an optimized structure for the club head for ball speed.

Yet another aspect of the present invention is an apparatus comprising a processor and a memory. The memory stores computer readable instructions that, when executed by the processor, cause the apparatus to: generate a radial basis function ("RBF") for stress of a golf club head from a finite element analysis ("FEA") program using a plurality of face thickness points for the golf club head and a plurality of body thickness points for the golf club head; generate a RBF for characteristic time ("CT") of a golf club head from a FEA program using a plurality of face thickness points for the golf club head and a plurality of body thickness points for the golf club head; generate a RBF for ball speed of a golf club head from a FEA program using a plurality of face thickness points for the golf club head and a plurality of body thickness points for the golf club head; and input the RBF for stress, the RBF for CT and the RBF for ball speed into an Adaptive Simulated Annealing algorithm to generate an optimized structure for the club head for ball speed.

Yet another aspect of the present invention is a method for optimizing the structure of a golf club head for ball speed. The method includes generating a radial basis function ("RBF") for stress of a golf club head from a finite element analysis ("FEA") program using a plurality of face thickness points for the golf club head and a plurality of body thickness points for the golf club head. The method also includes generating a RBF for characteristic time ("CT") of a golf club head from a FEA program using a plurality of face thickness points for the golf club head and a plurality of body thickness points for the golf club head. The method also includes generating a RBF for ball speed of a golf club head from a FEA program using a plurality of face thickness points for the golf club head and a plurality of body thickness points for the golf club head. The method also includes inputting a constrained RBF for stress, a constrained RBF for CT and the RBF for ball speed into a meta-modeled based optimization algorithm to generate an optimized structure for the club head for ball speed.

Yet another aspect of the present invention is a non-transitory computer readable medium storing instructions that optimize the structure of a golf club head for ball speed, when executed by a processor of an apparatus, cause the apparatus to: generate a radial basis function ("RBF") for stress of a golf club head from a finite element analysis ("FEA") program using a plurality of face thickness points for the golf club head and a plurality of body thickness points for the golf club head; generate a RBF for characteristic time ("CT") of a golf club head from a FEA program using a plurality of face thickness points for the golf club head and a plurality of body thickness points for the golf club head; generate a RBF for ball speed of a golf club head from a FEA program using a plurality of face thickness points for the golf club head and a plurality of body thickness points for the golf club head; and input a constrained RBF for stress, a constrained RBF for CT and the RBF for ball speed into a meta-modeled based optimization algorithm to generate an optimized structure for the club head for ball speed.

Yet another aspect of the present invention is an apparatus comprising a processor and memory. The memory stores computer readable instructions that, when executed by the processor, cause the apparatus to: generate a radial basis function ("RBF") for stress of a golf club head from a finite element analysis ("FEA") program using a plurality of face thickness points for the golf club head and a plurality of body thickness points for the golf club head; generate a RBF for characteristic time ("CT") of a golf club head from a FEA program using a plurality of face thickness points for the golf club head and a plurality of body thickness points for the golf club head; generate a RBF for ball speed of a golf club head from a FEA program using a plurality of face thickness points for the golf club head and a plurality of body thickness points for the golf club head; and input a constrained RBF for stress, a constrained RBF for CT and the RBF for ball speed into a meta-modeled based optimization algorithm to generate an optimized structure for the club head for ball speed.

Having briefly described the present invention, the above and further objects, features, and advantages thereof will be recognized by those skilled in the pertinent art from the following detailed description of the invention when taken in conjunction with the accompanying drawings.

DETAILED DESCRIPTION OF THE INVENTION

The present invention preferably uses an explicit based Finite Element Analysis (FEA) method in LS-Dyna® software to run impacts of a simulated golf ball into a simulated driver. LS-Dyna® results are preferably derived for full launch performance metrics, and manage durability, conformance, and sound. While existing techniques to run LS-Dyna® have improved, each iteration of the design output previously was guided by the stress of the solution. Simple two- or three-parameter experimental designs examined the correlation coefficients between variables and ball speed and CT, which required a great deal of analyst skill and time.

The method of the present invention increases the usefulness of FEA by using more of its data and making design exploration less analyst-dependent, thereby achieving optimized results within a design space. It also provides a solution that considers any number of design parameters and is easier to use.

Figure 1:
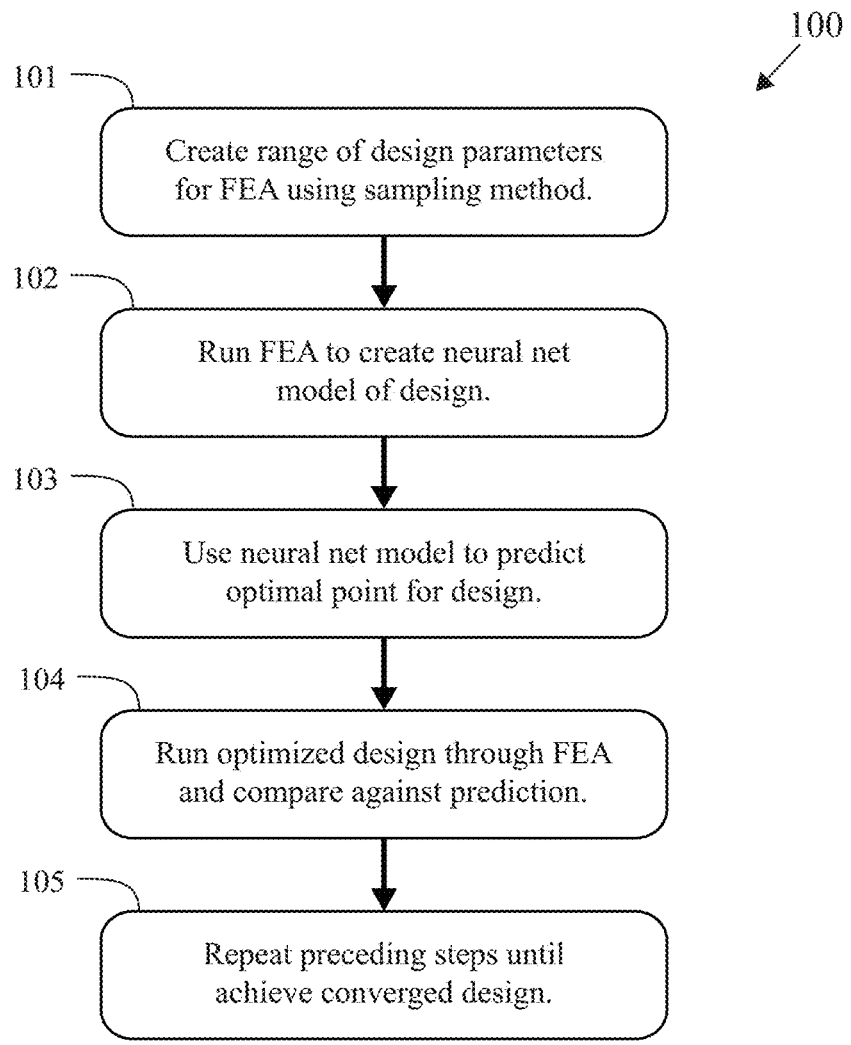
FIG. 1 is a flow chart illustrating a method of the present invention.

A method 100 for optimizing the structure of a golf club head for ball speed is shown in FIG. 1. At block 101, a sampling method is used to create a range of design parameters to create multiple designs for finite element analysis. At block 102, a finite element analysis is run to supply results needed to create a neural net model of a design. At block 103, a neural net model is used in an optimization routine to predict an optimal point for the design based on an objective. At block 104, the optimal design is run through finite element analysis and comparing it against the prediction. At block 105, the steps are repeated with a new sampling until a converged design is achieved, wherein the converged design is selected from the group consisting of a golf club head component and a golf ball. This method differs from guided machine learning routines in that the training set comprises designs from the sampling method and the hold out is the optimal result. This process is continued until an accurate model is provided or the results do not change from significantly from prior iterations.

Figure 2:
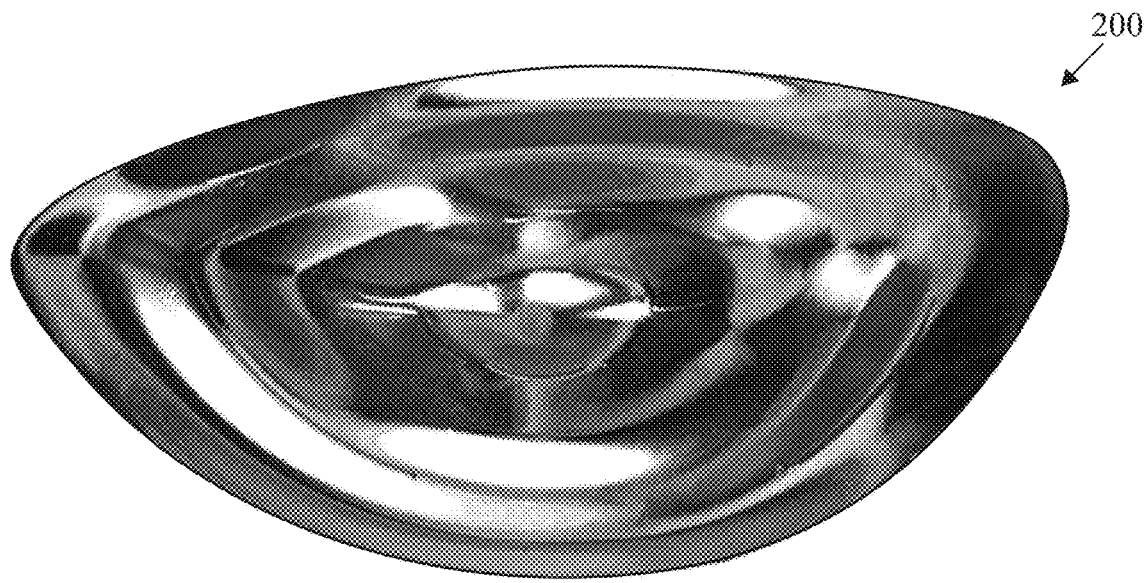
FIG. 2 is a face insert with a variable thickness pattern derived from the method shown in FIG. 1.
Figure 3:
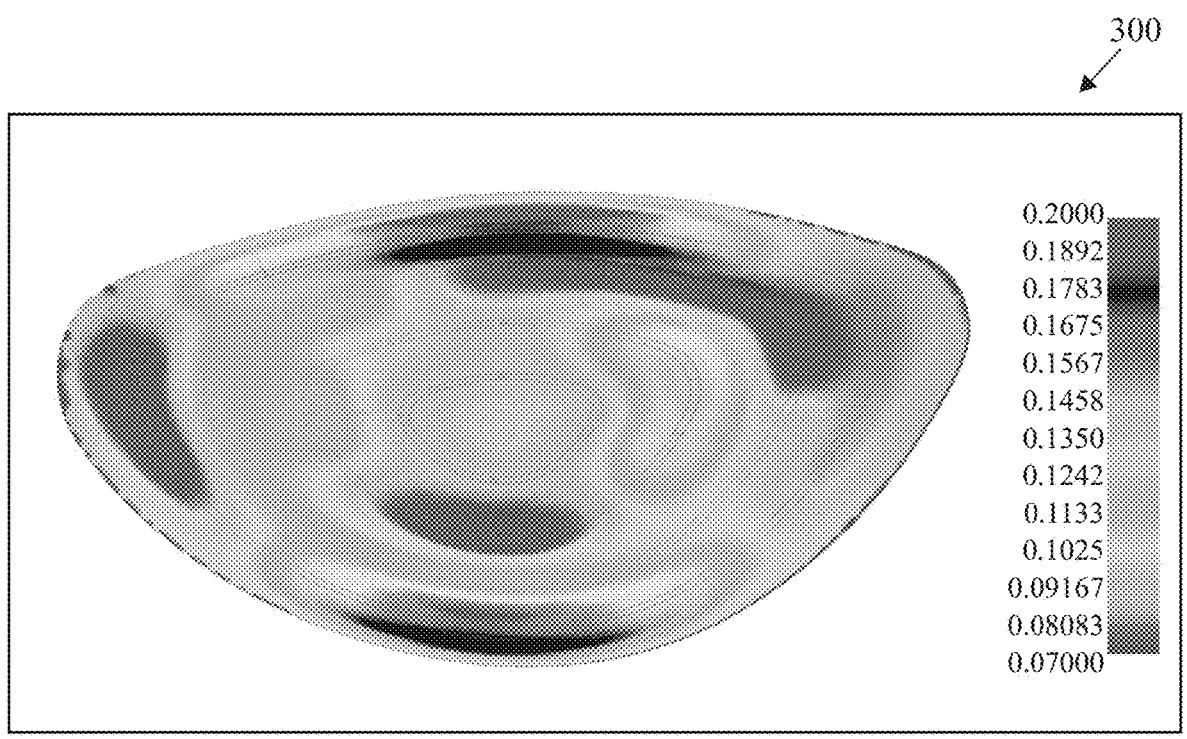
FIG. 3 is a thickness map of the face insert shown in FIG. 2.

The method of the present invention was utilized to design the variable thickness face design 200 shown in FIG. 2 and the face design 300 shown in FIG. 3. In this instance, the solution comprised selecting preferably from ten to hundred design parameters, more preferably from twenty to seventy design parameters, and most preferably thirty-four design parameters and running over one thousand design variations on these design parameters to achieve an optimized solution based on the following series of constraints: (1) a 200 Ksi stress constraint based on a Titanium 6-4 sheet material, (2) a 248 μs characteristic time (CT) constraint (for conformance purposes), and (3) a 196 gram head mass. The resulting design maximizes the coefficient of restitution of the face. The sampling was performed with a space filling algorithm, modeled with a Radial basis function, and optimized with a hybrid Adaptive Simulated Annealing algorithm to find the global optimal. LFOP was used to find the optimal result in the identified global optimal region.

Once the variable thickness pattern shown in FIGS. 2 and 3 was determined using the method of the present invention, forging and machining processes were used to manufacture the optimized face insert.

A variable thickness face insert designed using the method of the present invention may be incorporated into a standard golf club head, or may be combined with a body having other structural, mass-properties enhancing features. For example, the insert can be placed into a body with face stress-reducing features, such as those disclosed in U.S. Pat. Nos. 9,486,677, 9,597,558, 9,597,561, 9,687,701, 9,687,702, 9,694,257, 9,757,629, 9,776,058, 9,814,947, 9,821,199, 9,855,476, and 9,889,349, the disclosure of each of which is hereby incorporated by reference in its entirety herein. The insert may, alternatively, be combined with a body comprising one or more slots, channels, or grooves, such as those disclosed in U.S. Pat. Nos. 8,403,771, 8,529,368, 8,858,360, 8,956,242, 9,468,819, and 9,776,057, the disclosure of each of which is hereby incorporated by reference in its entirety herein. The insert may also be combined with a body having one or more stationary or movable weight members, such as those disclosed in U.S. Pat. Nos. 8,257,195, 8,328,661, 8,414,420, 8,425,346, 8,900,070, 8,926,448, 9,211,451, 9,586,105, 9,782,642, 8,894,506, 9,084,921, 8,696,491, 9,387,376, 9,675,856, 9,211,453, 9,289,660, 9,364,728, 8,790,195, 8,968,116, 9,623,294, 9,694,261, 9,636,553, 9,682,296, 9,694,256, 8,690,708, 9,022,881, 9,101,811, 8,834,294, 8,956,244, 9,067,110, 9,072,951, 9,180,349, 9,216,332, and 9,308,423, the disclosure of each of which is hereby incorporated by reference in its entirety herein.

When designing a golf ball using this method, accurate material models are required to achieve the level of detail needed for the results. This advanced accuracy requires a combination of lab-generated data from cyclic compression tests, drop tests, and Split-Hopkinson bar tests on the material, in addition to matching simulation results to PTM COR data on ball cores. This data is used to tune the material models by nine parameters. It uses the same techniques that are used to design the face. The only difference is that, instead of being constrained by stress, CT, and mass, the simulation objective is to minimize the difference between the test results and simulation data. The model fits where verified, using data from multilayer core tests. The result of 0.0008 COR point delta on the dual core is within two times the measurement error of the test, so combining material in the simulation can be as accurate as the physical test results. Results are provided in Table 1 below.

TABLE 1

| Material | Diameter | Tested COR | FEA COR | COR Delta |
| --- | --- | --- | --- | --- |
| −10 Comp | 0.938 | 0.760001 | 0.759925 | 7.6E−05 |
| −10 Comp | 1.615 | 0.76947 | 0.769612 | −1.40E−04 |
| 90 Comp | 0.938 | 0.768 | 0.767927 | 7.26E−05 |
| 90 Comp | 1.615 | 0.783 | 0.782968 | 3.17E−05 |
| Dual Core 90 comp outer −10 comp inner | 1.542 | 0.784 | 0.783196 | 8.04E−04 |

The method of the present invention optimizes golf balls and clubs for use with each other, while keeping these products in conformance with their respective rules. Simultaneous design gives a larger design space for exploration.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim:

1. A non-transitory computer readable medium storing instructions that optimize the structure of a golf club head for ball speed, when executed by a processor, cause the processor to:

generate a plurality of face thickness points and a plurality of body thickness points using a sampling technique to fill a design space using a finite element analysis ("FEA") program to generate a plurality of responses comprising a plurality of performance characteristics for the golf club head;

generate a surrogate model from the plurality of responses comprising generating a function for stress of the golf club head from a finite element analysis ("FEA") program of the golf club head using the plurality of face thickness points for the golf club head and the plurality of body thickness points for the golf club head, generating a function for characteristic time ("CT") of a golf club head from a FEA program using the plurality of face thickness points for the golf club head and the plurality of body thickness points for the golf club head, and generating a function for ball speed of a golf club head from a FEA program using the plurality of face thickness points for the golf club head and the plurality of body thickness points for the golf club head;

use the surrogate model in an optimization algorithm to provide an approximation of a lower sample space; and repeat a process until the surrogate model converges with the FEA for a predetermined objective to optimize the structure of a golf club head for ball speed.

2. The non-transitory computer readable medium according to claim 1 wherein use the surrogate model in an optimization algorithm to provide an approximation of a lower sample space comprises inputting a constrained function for stress, a constrained function for CT and the function for ball speed into a meta-modeled based optimization algorithm to generate an optimized structure for the club head for ball speed.

3. An apparatus comprising: a processor; and memory storing computer readable instructions that, when executed by the processor, cause the apparatus to:

generate a function for stress of a golf club head from a finite element analysis ("FEA") program using a plurality of face thickness points for the golf club head and a plurality of body thickness points for the golf club head;

generate a function for characteristic time ("CT") of the golf club head from the FEA program for the golf club head using the plurality of face thickness points for the golf club head and the plurality of body thickness points for the golf club head;

generate a function for ball speed of a golf club head from a FEA program using the plurality of face thickness points for the golf club head and the plurality of body thickness points for the golf club head; and input a constrained function for stress, a constrained function for CT and the function for ball speed into a meta-modeled based optimization algorithm to generate an optimized structure for the club head for ball speed.

4. The apparatus according to claim 3 wherein the plurality of face thickness points for the golf club head ranges from 25 to 50 points, and the plurality of body thickness points for the golf club head ranges from 2-6 points.

* * * * *